（12) United States Patent
Perkins

(10) Patent No.: US 12,392,652 B2
(45) Date of Patent: Aug. 19, 2025

(54) WATER LEVEL INDICATOR AND METHOD OF MANUFACTURE THEREOF

(71) Applicant: Union Carbide Corporation, Seadrift, TX (US)

(72) Inventor: Robbie M. Perkins, St. Charles, LA (US)

(73) Assignee: UNION CARBIDE CORPORATION, Seadrift, TX (US)

( * ) Notice: Subject to any disclaimer, the term of this patent is extended or adjusted under 35 U.S.C. 154(b) by 293 days.

(21) Appl. No.: 17/911,180

(22) PCT Filed: Mar. 11, 2021

(86) PCT No.: PCT/US2021/021893
§ 371 (c)(1),
(2) Date: Sep. 13, 2022

(87) PCT Pub. No.: WO2021/183757
PCT Pub. Date: Sep. 16, 2021

(65) Prior Publication Data
US 2023/0148173 A1    May 11, 2023

Related U.S. Application Data

(60) Provisional application No. 62/989,304, filed on Mar. 13, 2020.

(51) Int. Cl.
*G01F 23/34*     (2006.01)
(52) U.S. Cl.
CPC .................................. *G01F 23/34* (2013.01)
(58) Field of Classification Search
CPC ...................................................... G01F 23/34
See application file for complete search history.

(56) References Cited

U.S. PATENT DOCUMENTS 4,911,011 A * 3/1990 Fekete .................... G01F 23/34
338/33
6,041,650 A * 3/2000 Swindler ................ G01F 23/34
73/317
(Continued)

FOREIGN PATENT DOCUMENTS

GB        171407 A      2/1923
JP     H0723236 U      4/1995

OTHER PUBLICATIONS

International Search Report for International Application Serial No. PCT/US2021/021893; International Filing Date Mar. 11, 2021; Report Mail Date Jun. 16, 2021 (4 pages).

(Continued)

*Primary Examiner* — Eric S. McCall
(74) *Attorney, Agent, or Firm* — CANTOR COLBURN LLP

(57) ABSTRACT

Disclosed herein is a water level indicator for a pontoon tank comprising a float mechanism that comprises a support mechanism that does not move; wherein the main support mechanism is fixedly attached to a manway cover that protects the pontoon tank; an extension system with an extension rod adjustment system that contacts the main support mechanism at a first end and that contacts a float at a second end that is opposed to the first end; and a movable portion that comprises a plurality of levers; wherein the movable portion contacts the main support mechanism and the extension system; and wherein the plurality of levers act cooperatively to displace a gauge rod in proportion to a fluid level in the tank.

13 Claims, 5 Drawing Sheets

(56) References Cited

U.S. PATENT DOCUMENTS

| | | | | |
|---|---|---|---|---|
| 6,170,328 B1* | 1/2001 | Ross, Jr. | .................. | G01F 23/76 |
| | | | | 73/309 |
| 6,216,534 B1* | 4/2001 | Ross, Jr. | .................. | G01F 23/32 |
| | | | | 73/317 |
| 6,223,596 B1* | 5/2001 | Wilkins | .................. | G01F 23/56 |
| | | | | 73/321 |
| 6,253,609 B1* | 7/2001 | Ross, Jr. | .................. | G01F 23/38 |
| | | | | 73/317 |
| 7,240,690 B2* | 7/2007 | Schmitz | .................. | F16K 1/306 |
| | | | | 137/413 |
| 8,550,111 B2* | 10/2013 | Home | .................. | F16K 37/0008 |
| | | | | 73/317 |
| 2006/0207324 A1* | 9/2006 | Ross | ....................... | G01F 23/38 |
| | | | | 73/317 |
| 2014/0260603 A1* | 9/2014 | Blanchard | ............... | B23P 19/04 |
| | | | | 73/317 |

OTHER PUBLICATIONS

Written Opinion for International Application Serial No. PCT/US2021/021893; International Filing Date Mar. 11, 2021; Report Mail Date Jun. 16, 2021 (7 pages).

* cited by examiner

WATER LEVEL INDICATOR AND METHOD OF MANUFACTURE THEREOF

CROSS REFERENCE TO RELATED APPLICATIONS

This application is a National Stage application of PCT/US2021/021893, filed Mar. 11, 2021, which claims the benefit of U.S. Provisional Application No. 62/989,304, filed Mar. 13, 2020, both of which are incorporated by reference in their entirety herein.

BACKGROUND

Disclosed herein is a water level indicator, a method of manufacture thereof and articles comprising the same.

Floating roofs are often used for liquid storage tanks. Floating roofs are often equipped with one or more pontoons for increasing the buoyancy of the roof. A floating roof suitably equipped with pontoons (a) decreases the weight of the roof; (b) reduces the number of parts used in the construction of the roof; (c) increases the stability of the roof under all conditions; (d) insures efficient drainage of water from the top side of the roof and eliminates the possibility of an excessive quantity of rain water collecting and remaining on the roof; and (e) reduces the cost of manufacturing and erecting the roof.

There is therefore need for a floating mechanism that is more sensitive to water level in the pontoon tank so that immediate advance warning is provided to technicians who are responsible for roof maintenance.

SUMMARY

Disclosed herein is a water level indicator for a pontoon tank comprising a float mechanism that comprises a support mechanism that does not move; wherein the main support mechanism is fixedly attached to a manway cover that protects the pontoon tank; an extension system with an extension rod adjustment system that contacts the main support mechanism at a first end and that contacts a float at a second end that is opposed to the first end; and a movable portion that comprises a plurality of levers; wherein the movable portion contacts the main support mechanism and the extension system; and wherein the plurality of levers act cooperatively to displace a gauge rod in proportion to a fluid level in the tank.

Disclosed herein too is a method for manufacturing a water level indicator for a pontoon tank comprising contacting a support mechanism with an extension system and a movable portion that comprises a plurality of levers to form a float mechanism for the pontoon tank; wherein the support mechanism is fixedly attached to a manway cover that protects the pontoon tank; wherein the extension system comprises an extension rod adjustment system that contacts the support mechanism at a first end and that contacts a float at a second end that is opposed to the first end; and wherein the movable portion comprises a plurality of levers; wherein the movable portion contacts the main support mechanism and the extension system; and wherein the plurality of levers act cooperatively to displace a gauge rod in proportion to a fluid level in the tank.

Disclosed herein is a water level indicator for a pontoon tank comprising a float mechanism that comprises a support mechanism that does not move; wherein the main support mechanism is fixedly attached to a manway cover that protects the pontoon tank; an extension system comprising an extension rod that contacts a float at a one end and a gauge rod at n end that is opposed to the end that contacts the float; where the support mechanism contacts the extension rod at its mid-section; and where a displacement of the float is transmitted to the gauge rod causing it to be proportionately displaced.

DETAILED DESCRIPTION

Disclosed herein is a water level indicator that is in operative communication with a sensitive floating mechanism (hereinafter float mechanism) for use in pontoons/bulkheads that increase the buoyancy of floating roofs having liquid storage tanks (hereinafter floating roof tanks) contained thereon. The float mechanism comprises a plurality of levers that enable greater sensitivity and detection of the presence of fluids such as rain water and other chemicals that may accumulate in the pontoon/bulkhead thereby causing buoyancy issues and damage to the floating roof.

A floating roof tank is typically used for storing highly volatile liquids such as crude oil and gasoline. Recently, the capacity of the floating roof tanks has rapidly increased with increase in the consumption of fuel and the capacity of a tankers that transport a great volume of petroleum. This has given rise to the problem that the pontoon type floating roof is sunk or destroyed due to loads by rainwater or petroleum accumulated in the pontoon/bulkhead and going unnoticed.

It is therefore desirable to provide a safety pontoon type floating roof for liquid storage tanks, which prevents the roof from being damaged due to loads such as rainwater or other fluids (e.g., fluids produced in the plant such as liquid chemicals) accumulated thereon. It is also desirable to provide a pontoon type floating roof for liquid storage tanks which is capable of effectively and rapidly draining liquid, such as, for example, rainwater, which might otherwise accumulate on the roof. On manner of accomplishing this is to use a tank with a water level indicator for the pontoons/bulkheads that has greater sensitivity to and can detect the presence of fluids (such as rain water and chemicals) that may accumulate in the pontoon/bulkheads creating buoyancy issues thereby causing damage to the floating roof.

Figure 1:
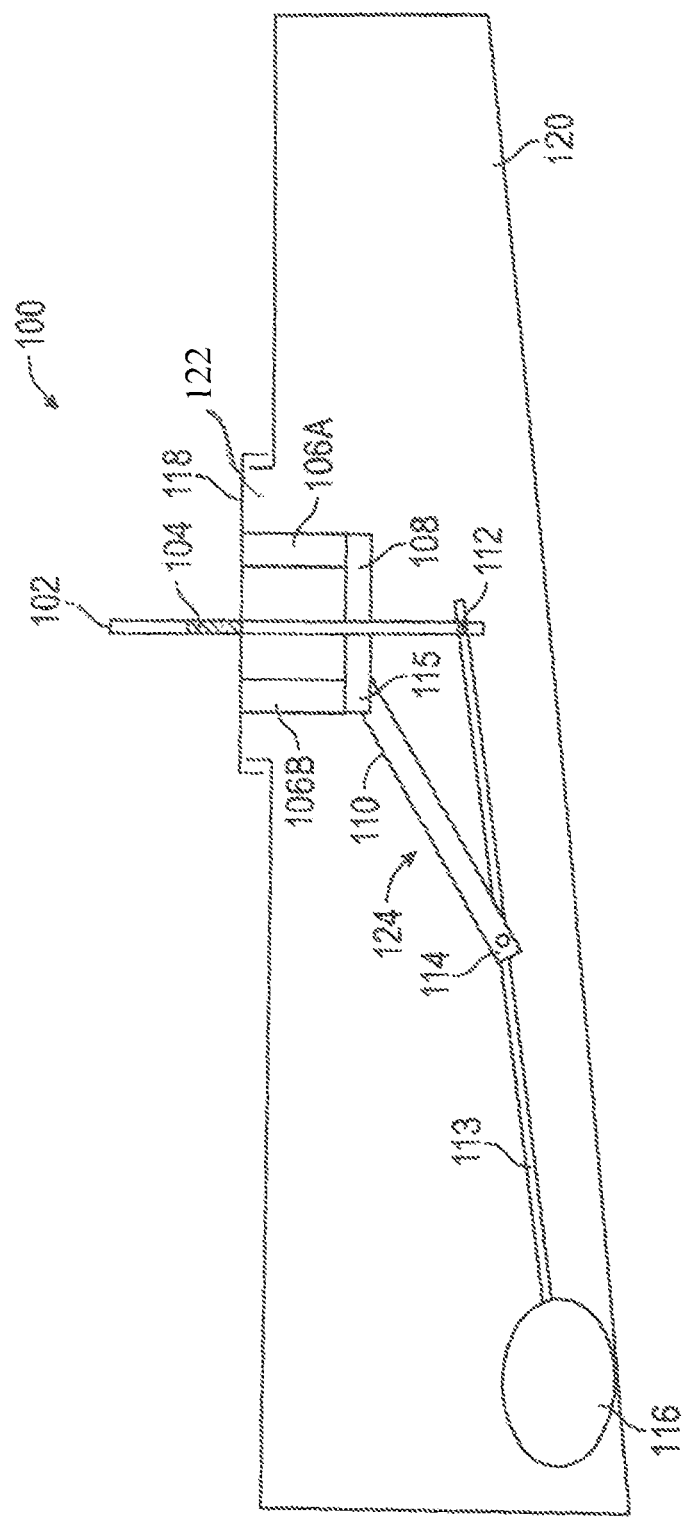
FIG. 1 depicts one embodiment of a pontoon 100 that facilitates buoyancy of the floating roof and drainage of fluids (such as water and chemicals) from the top side of the roof.

In an embodiment, the water level indicator for the pontoon tank comprises a float mechanism that comprises a support mechanism that does not move. The main support mechanism is fixedly attached to a manway cover that provides access to the pontoon. The extension system comprises an extension rod that contacts a float at a one end and a gauge rod at the end opposite to the end that contacts the float. The support mechanism contacts the extension rod at its mid-section. The displacement of the float is transmitted to the gauge rod causing it to be proportionately displaced. FIG. 1 depicts one embodiment of a pontoon 100 that facilitates buoyancy of the floating roof and drainage of fluids (such as water and chemicals) from the top side of the roof and attempts to eliminate the possibility of an excessive quantity of rain water collecting and remaining on the roof.

The fluids are generally in the liquid state. The pontoon 100 comprises a tank 120 (also known as the pontoon/bulkhead 120) with an opening 122. The opening 122 permits access to the inside of the pontoon/bulkhead 120 and is contacted by a manway cover 118. The manway cover 118 provides access to the pontoon/bulkhead 120 via the opening 122. The manway cover 118 has fixedly attached thereto a floating mechanism 124 that measures fluid level in the tank and provides an indication of the amount of fluid collected in the pontoon/bulkhead.

The floating mechanism 124 comprises a main support mechanism (that is fixed) comprising two vertical beams 106A and 106B and a horizontal beam 108 that is fixedly attached to a first end of both vertical beams 106A and 106B. The second end of the vertical beams 106A and 106B is fixedly attached to the bottom side of the manway cover 118. The top side of the manway cover 118 faces the ambient atmosphere. A lever 110 has a first end 115 that is fixed to the main support mechanism. The lever 110 is fixed and does not move. It contacts a first lever 113 (also called the extension rod 113) at its midsection 114. The first lever 113 pivots about point 114.

A gauge rod 102 having a scale 104 attached thereto slides through a passage in the manway cover 118 and the horizontal beam 108. The scale 104 provides a visual indication of the height of the fluid in the tank 120. A float 116 is attached to one end of first lever 113, while the other end of the first lever 113 rotatably pivots about the bottom 112 of the gauge rod 102.

When fluid (e.g., water) collects in the pontoon/bulkhead 120, the float 116 begins to become buoyant thus causing the gauge rod 102 to change its position via motion transmitted to it via the first lever 113. The change in position of the gauge rod 102 as read on the scale 104 is indicative of the amount of fluid collected in the tank 120. The device in the FIG. 1 is designed to reflect a leverage ratio of 0.5 to 1 to 1.5:1, preferably 0.8:1 to 1.2:1. The leverage ratio is the ratio of vertical lift of the float to the vertical change in position of the gauge rod. For example, when the float 116 lifts 1 inch (2.54 centimeters) and the gauge rod 102 moves 1 inch in the vertical direction (either upwards or downwards in response to an upward motion of the float), the leverage ratio is calculated to be 1:1. In an embodiment, the entire floating mechanism 100 can be removed from the tank 120 (as a single piece) through the opening 122 by removing the manway cover.

Figure 2:
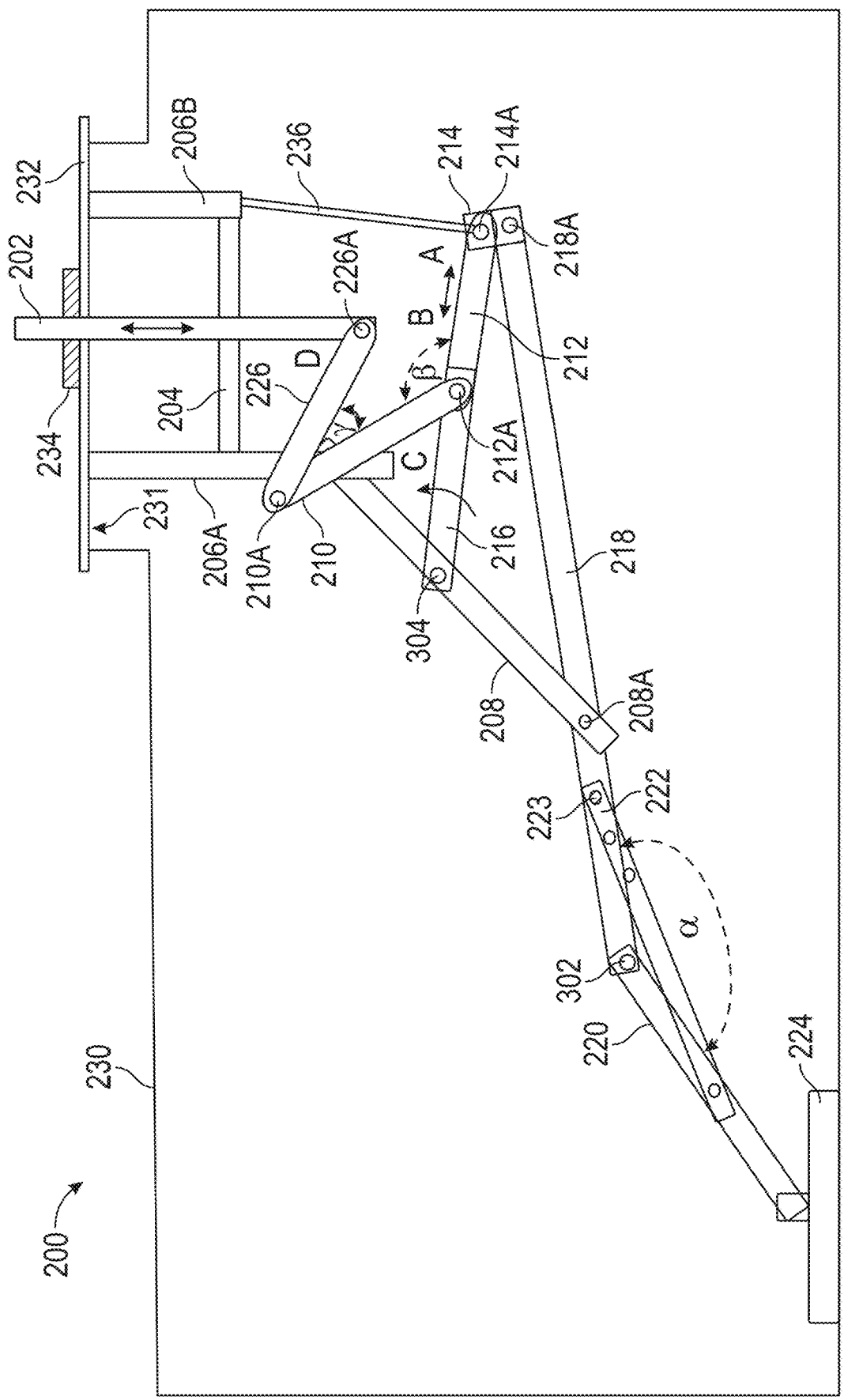
FIG. 2 is a schematic depiction of a pontoon with the water level indicator that is in operative communication with a sensitive floating mechanism.
Figure 3:
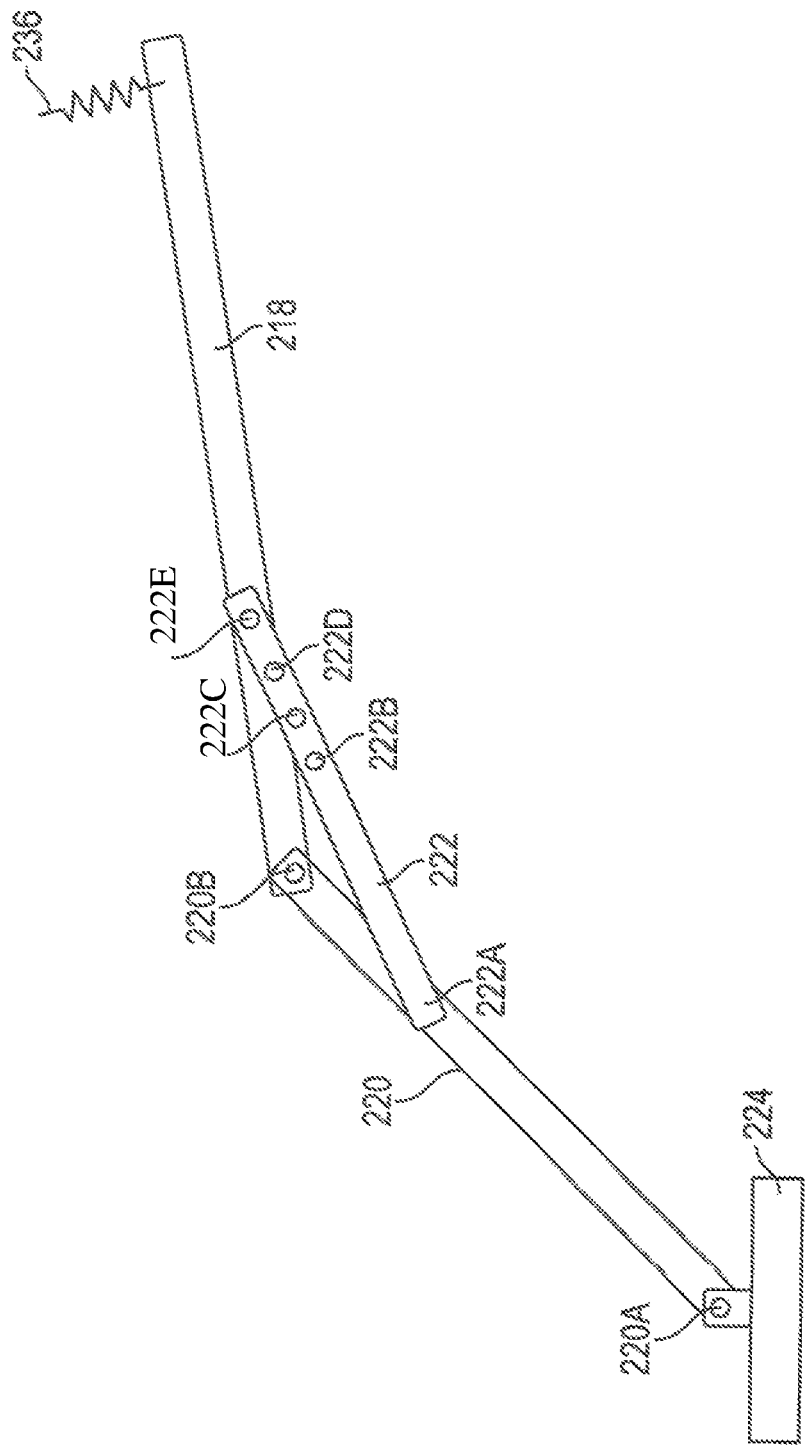
FIG. 3 is a depiction of the extension system with an extension rod adjustment system of the FIG. 2.
Figure 4:
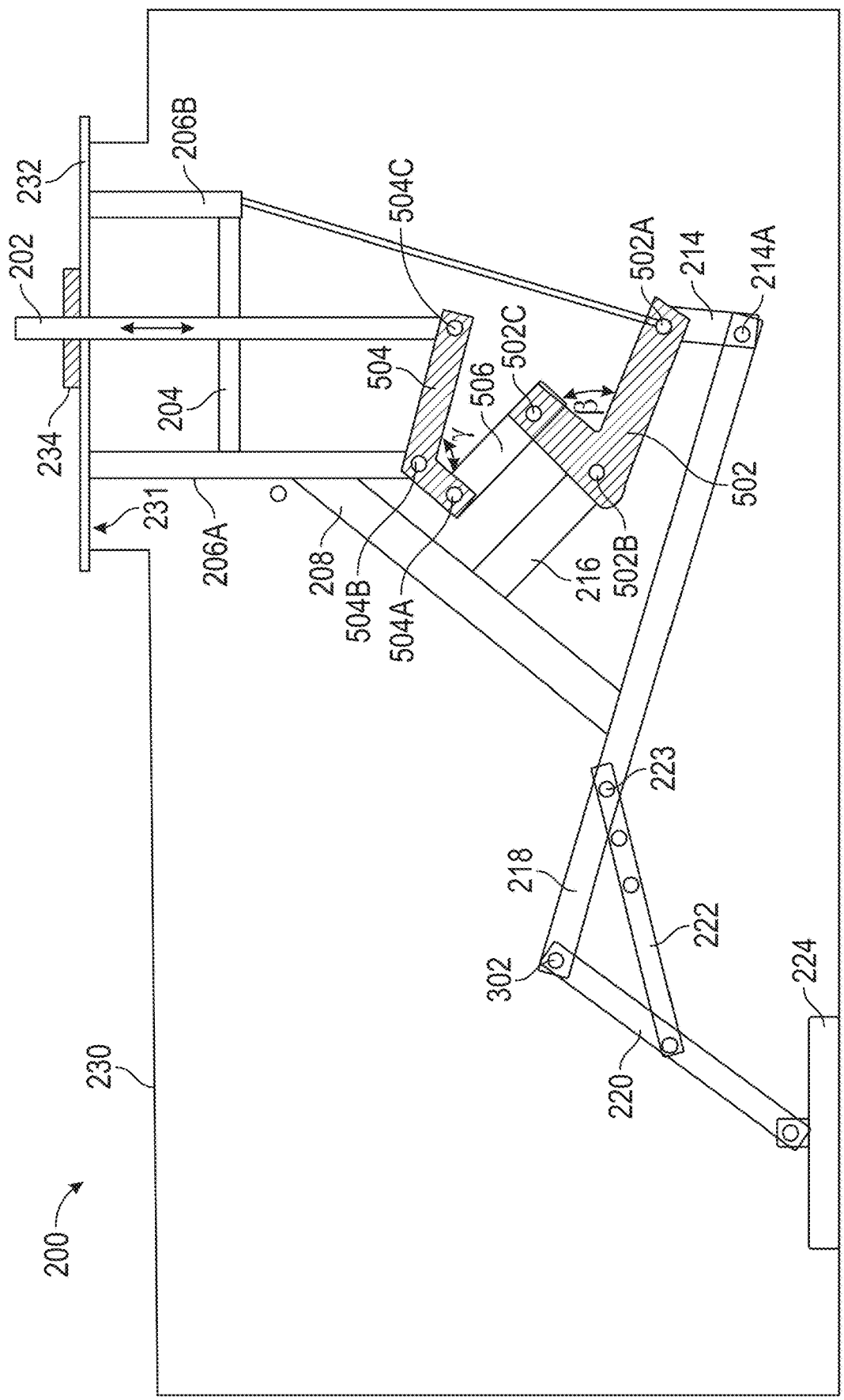
FIG. 4 is another schematic depiction of a pontoon with the water level indicator that is in operative communication with a sensitive floating mechanism.

While the device shown in the FIG. 1 is capable of indicating water level in the pontoon/bulkhead 120, the float mechanism designs detailed below in the FIGS. 2 to 4 are more sensitive and have leverage ratios of 1:1.8 to 1:5, preferably 1:2 to 1:4.

With reference now to the FIG. 2, a pontoon 200 comprises a tank 230 with an opening 231 that is protected by a manway cover 232. Affixed to the manway cover 232 is a float mechanism that comprises a main support mechanism that does not move and is always fixed, an extension system with an extension rod adjustment system and a movable portion that contains a plurality of levers. The fixed main support mechanism works in conjunction with the extension rod adjustments and the movable portion (that contains a plurality of levers) to cause a displacement in the gauge rod 202, when a fluid such as water or chemicals collect in the pontoon/bulkhead 230.

The main support mechanism comprises two vertical beams-a first vertical beam 206A and a second vertical 206B, both of which contact a horizontal beam 204. The first vertical beam 206A is longer than the second vertical beam 206B by an amount of 10 to 50%, preferably 20 to 40%, based on the length of the second vertical beam 206B. In addition to the beams 206A, 206B and 204, the main support mechanism comprises a first inclined beam 208 that is fixedly attached to the first vertical beam 206A.

A second inclined beam 216 contacts the first inclined beam 208 and rotatably pivots about point 304. The second inclined beam 216 can rotate about the first inclined beam 208 at point 304 and can contact it (the first inclined beam 208) anywhere along its length. In an embodiment, the second inclined beam 216 contacts the first inclined beam 208 a distance between ⅓ (one-third) and ½ (one-half) of the distance as measured from its (the first inclined beam 208) point of contact with the first vertical beam 206A.

In an embodiment, the main support mechanism is fixed. In other words, the vertical beams 206A and 206B do not move relative to each other or with respect to the horizontal beam 204. Similarly, the first inclined beam 208 is fixed and does not move with respect to the beams 206A, 206B and 204. The first inclined beam and the beams 206A, 206B and 204 can be fixedly attached to each other by welding, by using adhesives, or by using other forms of fastening such as bolts, screws, nuts, and the like.

The length of the second inclined beam 216 is selected such that it rotates anticlockwise when the float 224 buoys itself due to the presence of a fluid in the tank 230. This will detailed later.

The extension system comprises three beams-a first extension beam 218, a second extension beam 220 and an extension adjustment rod 222. The first and second beams 218 and 220 can move with respect to each other via pivot point 302 but are fixed in position via an extension adjustment rod 222. As will be explained later, the angle between the first extension beam 218 and the second extension beam 220 can be adjusted by using the extension adjustment rod 222. This mechanism can be used to adjust the sensitivity of the float mechanism.

The first extension beam 218 is contacted by the first inclined beam 208 at any point along its length. In an embodiment, the first extension beam 218 is contacted by the first inclined beam 208 at a point that lies between 10% and 50%, preferably 20% to 40% of the length of the first extension beam 218 measured from the end that contacts the second extension beam 220. In an embodiment, the first extension beam 218 functions as a lever with its fulcrum point 302 located at the point of contact of the first inclined beam 208 with the first extension beam 218. In an embodiment, the first extension beam 218 functions as a 2:1 lever with its fulcrum located at point 302. The first extension beam 218 and the second extension beam 220 extend outwards and away from the first vertical bam 206A of the main support mechanism. They extend radially outwards towards the outer periphery of the tank 230 and downwards towards the bottom of the tank 230.

The second extension beam 220 extends from an end of the first extension beam 218 (at 220B) and contacts the float 224 at its (the second extension beam 220) opposing end (at 220A). The first extension beam 218 and the second extension beam 220 are rotatably connected at a pivot point 302. An angle α between the first extension beam 218 and the second extension beam 220 can be varied from 30 degrees to 180 degrees, preferably 50 to 150 degrees.

The extension adjustment rod 222 facilitates fixing the angle α between the first extension beam 218 and the second extension beam 220. As may be seen in the FIG. 3, the extension adjust rod 222 has a plurality of ports 222B, 222C, 222D and 222E along its length (shown in the FIG. 3) that can accommodate one or more protrusion(s) (see e.g., 223 in FIG. 2) present in either the first extension beam 218 or in the second extension beam 220 or in both the first extension beam 218 and in the second extension beam 220. In an embodiment, one end of the extension adjustment rod 222 is rotatably pivoted off of either the first extension beam 218 or to the second extension beam 220, while a port at the other opposing end (of the extension adjustment rod 222) is coupled to a protrusion located on the extension beam. In other words, if one end of the extension adjustment rod 222 is rotatably fixed to the first extension beam 218, then the other end of the extension adjustment rod 222 will be coupled to a protrusion located on the second extension beam 220 and vice versa.

By using different ports 222B, 222C, 222D and 222E, the angle α between the first extension beam 218 and the second extension beam 220 can be varied. In the embodiment depicted in the FIG. 3, one end of the extension beam 220 is rotatably attached to the second extension beam 220 at 222A, while the other end is fixedly attached to the first extension beam 218 at port 222E.

This adjustable feature of extension adjustment rod 222 depicted in the FIGS. 2 and 3 is useful for accommodating different sizes of pontoon tanks. The feature can also be used for accommodating tanks having different geometries. It may also be used to adjust the sensitivity of the float mechanism.

With reference now to FIG. 2, it is to be noted that the once a particular port (e.g., 222B, 222C, 222D or 222E) is coupled with a particular protrusion on the first extension beam 218, the angle α between the first extension beam 218 and the second extension beam 220 is fixed. In order to change the angle α between the first extension beam 218 and the second extension beam 220, the port 222B, 222C, 222D or 222E is to be decoupled from the protrusion on the first extension beam 218 and a new port is to be coupled with the protrusion. This feature can also be used to let the float 224 travel up or down as desired.

The float 224 is preferably of a lower density than the fluid that collects in the tank and therefore floats atop the fluid. The float 224 may have any geometrical shape that provides it with a large surface area that can contact the fluid. In other words, its surface area is selected to be large enough so that it is sensitive to the presence of fluid and begins to become buoyant immediately upon being contacted by the fluid.

The float is preferably manufactured from a polymer that is insoluble in the fluid that it is to be buoyant in. The polymer is preferably a foamed organic polymer. Organic polymers may be selected from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Examples of thermoplastic polymers that can be used in the polymeric material include polyacetals, polyacrylics, polycarbonates, polyalkyds, polystyrenes, polyolefins, polyesters, polyamides, polyaramids, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

The float can also be manufactured from a thermoset polymer (i.e., a crosslinked polymer). It is desirable for the polymer to be water insoluble. Polyolefins are preferred polymers for use in the float 224.

The movable portion of the mechanism comprises a plurality of levers that communicate the presence of fluid (via buoyancy of the float) to the gauge rod 202. The plurality of levers include a first lever 214, a second lever 212, a third lever 210 and a fourth lever 226. A spring 236 contacts the first lever 214 at one end and the fixed frame at the opposite end. The spring 236 damps motion of the beam 218. Each of the levers 214, 212, 210 and 226 contact each other via a rotatable pivot point that enable each of them to rotate with respect to each other. This will be discussed in detail later. The rotatable pivot point may be rivet, a bolt and nut combination or a screw. The rotatable pivot point may comprise a bearing that permits rotary motion about the pivot point if desired.

The first lever 214 is in contact with the end of the first extension beam 218 and preferably extends perpendicular to a longitudinal axis of the beam 218. The first lever 214 contacts the first extension beam 218 at rotatable pivot point 218A. The opposite end of the first lever 214 contacts one end of the second lever 212 at a rotatable pivot point 214A, while the opposite end of the second lever 212 contacts the third lever 210 at a rotatable pivot point 212A. It is to be noted that the second lever 212 and the third lever 210 contact the second inclined beam 216 at pivot point 212A.

The opposite end of the third lever 210 contacts the fourth lever 226 at a rotatable pivot point 210A, while the opposite end of the fourth lever 226 contacts the gauge rod 202 at pivot point 226A.

As may be seen in the FIG. 2, the second lever 212 extends between the first lever 214 and the third lever 210, while the third lever 210 extends between the second lever 212 and the fourth lever 226. The fourth lever 226 extends between the third lever 210 and the gauge rod 202. All of the levers—the first lever 214, the second lever 212, the third lever 210 and the fourth lever 226 can rotate with respect to each other. For example, when the float 224 begins to float as a result of the presence of fluid in tank 230, the first extension rod 218 moves downwards causing an increase in the angle β between the second lever 212 and the third lever 210. This is because the second lever 212 and the third lever 210 can rotate with respect to each other. There is also an increase in the angle γ between the third lever 210 and the fourth lever 226, which causes the gauge rod 202 to move vertically through the passages in the horizontal beam 204 and the manway cover 232.

The second lever 212 rotates clockwise about pivot point 214A when the first extension rod 218 moves downwards (due to the upwards motion of the float 224). The clockwise rotation of the second lever 212 causes an anticlockwise rotation of the second inclined beam 216 about pivot point 304. This causes anticlockwise rotation of the third lever 210 as well as the fourth lever 226, which in turn promotes motion of the gauge rod 202.

The gauge rod 202 contacts the manway cover 232 and the horizontal beam 204.

The manway cover 232 and the horizontal beam 204 contain passages through which a gauge rod 202 can travel back and forth. The passage in the manway cover 232 is plugged with a seal (which also contains a passage) 234 through which the gauge rod 202 can travel back and forth. The seal 234 can be manufactured from a polymer, preferably an elastomer.

Suitable elastomers that are used in the seal are polybutadienes, polyisoprenes, styrene-butadiene rubber, poly(styrene)-block-poly(butadiene), poly(acrylonitrile)-block-poly(styrene)-block-poly(butadiene) (ABS), polychloroprenes, epichlorohydrin rubber, polyacrylic rubber, silicone elastomers (polysiloxanes), fluorosilicone elastomers, fluoroelastomers, perfluoroelastomers, polyether block amides (PEBA), chlorosulfonated polyethylene, ethylene propylene diene rubber (EPR), ethylene-vinyl acetate elastomers, or the like, or a combination thereof.

The levers, beams and rods generally comprise a light weight metal that does not undergo degradation in the presence of the fluid that accumulates in the tank. Suitable metals are aluminum, steel, copper, titanium, or alloys thereof. In an embodiment, the levers, beams and rods that constitute the float mechanism disclosed herein may also comprise the polymers listed above.

With reference now to the FIGS. 2 and 3, when fluid collects in the tank 230, the float 204 becomes buoyant, which causes the first extension beam 218 to rotatably pivot about the first inclined beam 208 at pivot point 208A. As the first extension beam 218 rotates about pivot point 208A, it causes its downward motion to be transferred to gauge rod 202 via the first lever 214, the second lever 212, the third lever 210 and the fourth lever 226.

The spring 236 serves to moderate motion of the mechanism. Rotary motion about pivot point 212A and 210A brought on by the downward motion of the first extension beam 218 causes levers 214, 212, 210 and 226 to rotate with respect to each other and to move the gauge rod vertically thus indicating the amount of fluid present in the tank 230.

FIG. 4 depicts another embodiment of the float mechanism of the FIG. 2. In this mechanism the second lever 212 and the third lever 214 of the float mechanism are a joined together to form a single piece 502 (hereinafter the sixth lever 502), while the third lever 210 and the fourth lever 226 are joined to form a single piece 504 (hereinafter the seventh lever 504). A fifth lever 506 is rotatably pivoted between the sixth lever (at point 502A) and the seventh lever (at point 504A).

In the design depicted in the FIG. 4, the second inclined beam 216 is fixedly attached to the first inclined lever 208. The main support mechanism in the FIG. 4 thus comprises the first vertical beam 206A and the second vertical 206B, both of which contact the horizontal beam 204. In addition to the beams 206A, 206B and 204, the main support mechanism comprises the first inclined beam 208 that is fixedly attached to the first vertical beam 206A and the second inclined beam 216 that is fixedly attached to the first inclined beam 208. The design depicted in the FIG. 4 differs from that in the FIG. 2 in that the second inclined beam in the FIG. 4 is fixed, while in the FIG. 2, it can rotatably pivot about point 304.

The extension system of the FIG. 4 is the same as that of the FIG. 2. In the interests of brevity, the extension system of FIG. 4 will not be described any further. The reader can assess the function of this system by resorting to the information provided with regard to the FIGS. 2 and 3.

The movable portion of the float mechanism of the FIG. 4 differs from that of the FIG. 2 in that the second lever and a portion of the third lever are joined to form the sixth lever 502 while the remaining portion of the third lever and the fourth lever are joined to form the seventh lever 504. The sixth lever and the seventh lever are not really lever number 6 and 7 respectively, but are so named to given them a different identifier from the previously named levers. The sixth and seventh levers are each L shaped (also described as boomerang shaped). The sixth lever 502 rotatably pivots about points 502A, 502 B and 502C respectively, while the seventh lever 504 rotatably pivots about points 504A, 504 B and 504C respectively. The angles β and γ between the respective arms of the sixth lever 502 and the seventh lever 504 can vary from 50 degrees to 150 degrees, preferably between 70 to 120 degrees. A fifth lever 506 is rotatably pivoted between the sixth lever 502 and the seventh lever 504 and contacts the sixth lever 502 and the seventh lever 504.

As may be seen in the FIG. 4, the sixth lever 502 contacts the first lever 214 at pivot 502A. It contacts the second inclined beam 216 at pivot point 502B. It contacts the fifth lever 506 at pivot point 502C. The opposite end of the fifth lever 506 contacts the seventh lever 504 at pivot point 504A while the opposite end of the seventh lever 504 contacts the gauge rod 202 at pivot point 504C. The seventh lever rotatably pivots about point 504B on the vertical beam 206A. A spring 236 contacts the vertical beam 206B (or alternatively the horizontal beam 204)

With respect to the FIG. 4, when the water lever in the tank rises, the float 224 rises thus causing the first extension beam 218 to move downwards. This causers the sixth lever 502 to rotate clockwise about pivot point 502B. This clockwise motion of the sixth lever 502 rotates the seventh lever 504 in the anticlockwise direction about pivot point 504B, by virtue of the motion transmitted to it by the fifth lever 506. The anticlockwise motion of the seventh lever 504 causes the gauge rod 202 to move vertically. Thus as the fluid level in the tank rises, the float 224 rises and in turn causes the gauge rod to move vertically. The displacement of the float is proportional to the displacement of the gauge rod.

As noted above, for the designs shown in the FIGS. 2 through 4, the displacement of the float is amplified. When the float is displaced by 1 inch, the gauge rod is displaced by at least 1.8 inches to 5 inches. The displacement ratio is also termed the leverage ratio as detailed above. For the design seen in the FIG. 4, the leverage ratio is at least 1:2 (i.e., for every 1 inch displacement of the float, the gauge rod is displaced at least 2 inches).

The design disclosed herein is suitable because it permits retrofitting old pontoon tanks with a new, more sensitive mechanism. This retrofitting can be accomplished without any significant alternation to the tank. In addition, the new design can be introduced into the pontoon tank and removed from it by a technician located outside the tank. This eliminates the possibility of danger to the technician who does not have to enter the tank and encounter potentially dangerous fumes.

Figure 5A:
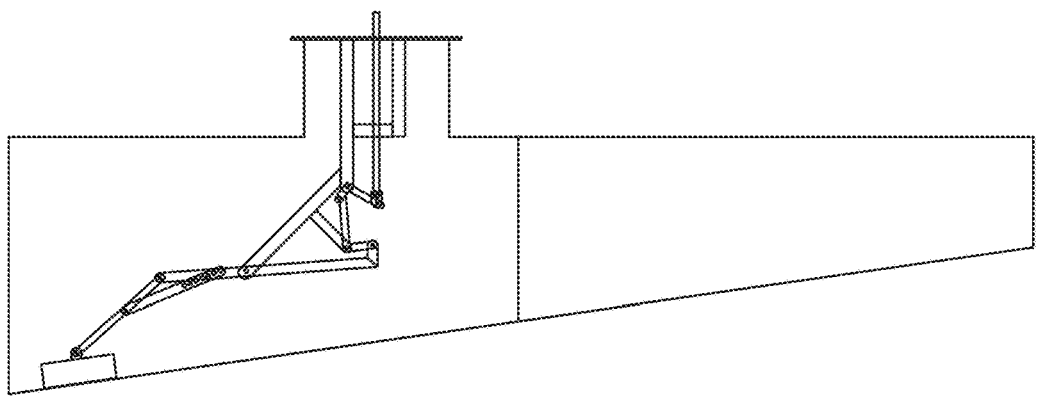
FIG. 5A is a schematic depiction of the water level indicator that is fitted into the pontoon tank.
Figure 5B:
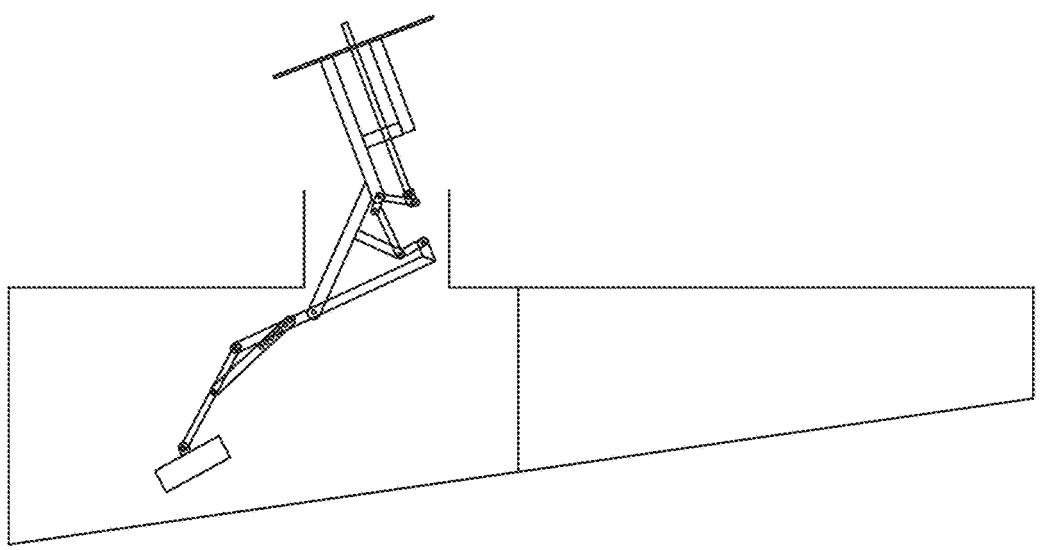
FIG. 5B is a schematic depiction of the water level indicator as it is being removed from the pontoon tank.
Figure 5C:
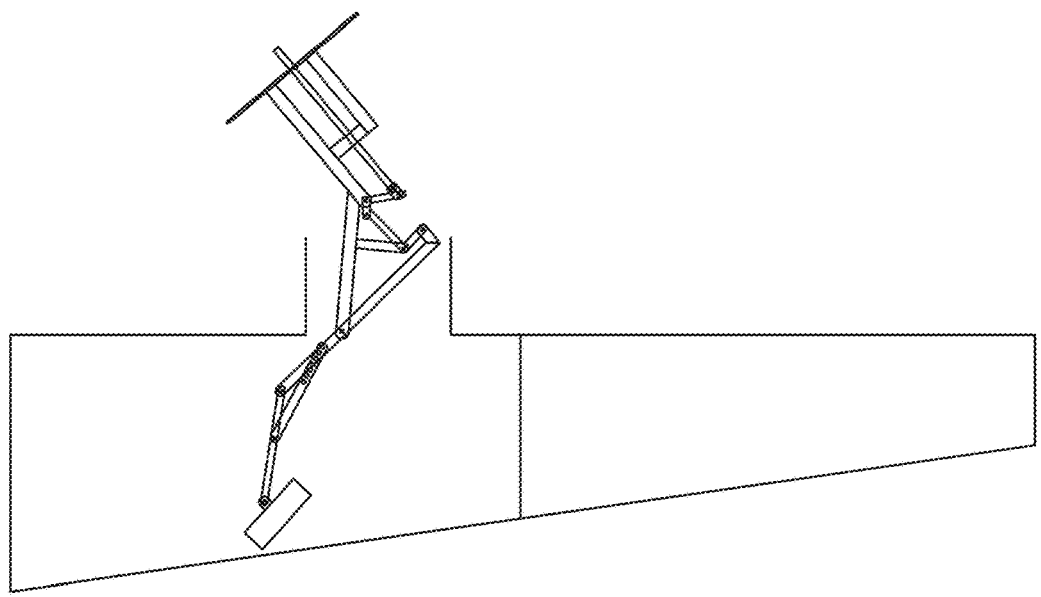
FIG. 5C is another schematic depiction of the water level indicator as it is being removed from the pontoon tank.

This feature is depicted in the series of FIGS. 5A-5C, which show the float mechanism depicted in the FIGS. 2 and 4 being installed and removed by installing and removing the manway cover respectively. FIG. 5A depicts the manway cover with the mechanism installed in the pontoon tank 230. FIG. 5B depicts an initial step in the removal of the manway cover with the mechanism attached thereto. FIG. 5C depicts another step in the removal of the manway cover with the mechanism attached thereto. In other words, the entire device can be removed and inserted into the tank via the opening 122 (see FIGS. 1, 2 and 4). This design advantageously permits existing tanks to be retrofitted.

It is to be noted that the bottom of the tank can be inclined as seen in the FIG. 1 or horizontal as seen in the FIGS. 2 and 4. There is no limitation on which tank bottom is used. For example, while the design in the FIG. 1 has an inclined bottom, it can also have a horizontal flat bottom. The same logic applies to the tanks of the FIGS. 2 and 4.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A water level indicator for a pontoon tank comprising:
a float mechanism that comprises:
a support mechanism that does not move; wherein the support mechanism is fixedly attached to a manway cover that protects the pontoon tank;
an extension system with an extension rod adjustment system that contacts the support mechanism at a first end and that contacts a float at a second end that is opposed to the first end; and
a movable portion that comprises a plurality of levers; wherein the movable portion contacts the support mechanism and the extension system; and wherein the plurality of levers act cooperatively to displace a gauge rod in proportion to a fluid level in the tank; wherein the support mechanism comprises a first vertical beam and a second vertical beam, where the first vertical beam is longer than the second vertical beam; a horizontal beam in contact with each of the two vertical beams, a first inclined beam that contacts the first vertical beam; and a second inclined beam that contacts the first inclined beam at a distance between ⅓ (one-third) and ½ (one-half) of the distance as measured from the first inclined beams point of contact with the first vertical beam.

2. The water level indicator of claim 1, wherein the water level indicator is retrofitted onto the pontoon tank.

3. The water level indicator of claim 1, wherein the water level indicator is fixedly attached to the manway cover; and wherein the manway cover with the water level indicator attached thereto can be wholly removed from outside the pontoon tank without damaging the tank.

4. The water level indicator of claim 1, wherein the first inclined beam functions as a 2:1 lever with its fulcrum located at a point of contact of the first inclined beam with the second inclined beam.

5. The water level indicator of claim 4, wherein the extension system comprises three beams—a first extension beam that contacts the first inclined beam, a second extension beam that contacts the first extension beam, and an extension adjustment rod that contacts the first extension beam and the second extension beam; where the first extension beam extends away from the first vertical beam.

6. The water level indicator of claim 5, wherein the extension adjustment rod fixes the angle of the first extension beam and the second extension beam.

7. The water level indicator of claim 5, wherein the plurality of levers comprises a first lever that contacts the first extension beam, a second lever that contacts the first lever, a third lever that contacts the second lever, and a fourth lever that contacts the gauge rod at one end and contacts the third lever at an opposite end of the fourth lever and wherein the first lever, the second lever, the third lever and the fourth lever rotate with respect to each other.

8. The water level indicator of claim 7, wherein a rotary motion of the fourth lever causes a displacement of the gauge rod, thereby indicating water level in the tank.

9. The water level indicator of claim 5, wherein the extension system further comprises a float that contacts the second extension beam; where the float is buoyant in a fluid that collects in the tank.

10. The water level indicator of claim 9, wherein the float comprises a polymer.

11. The water level indicator of claim 10, wherein the polymer is not soluble in water.

12. A method for manufacturing a water level indicator for a pontoon tank comprising:
contacting a support mechanism with an extension system and a movable portion that comprises a plurality of levers to form a float mechanism for the pontoon tank;
wherein the support mechanism is fixedly attached to a manway cover that protects the pontoon tank;
wherein the extension system comprises an extension rod adjustment system that contacts the support mechanism at a first end and that contacts a float at a second end that is opposed to the first end; and
wherein the movable portion comprises a plurality of levers; wherein the movable portion contacts the support mechanism and the extension system; and wherein the plurality of levers act cooperatively to displace a gauge rod in proportion to a fluid level in the tank; wherein the support mechanism comprises a first vertical beam and a second vertical beam, where the first vertical beam is longer than the second vertical beam; a horizontal beam in contact with each of the two vertical beams, a first inclined beam that contacts the first vertical beam; and a second inclined beam that contacts the first inclined beam at a distance between ⅓ (one-third) and ½ (one-half) of the distance as measured from the first inclined beams point of contact with the first vertical beam.

13. A water level indicator for a pontoon tank comprising:
a float mechanism that comprises:
a support mechanism that does not move; wherein the support mechanism is fixedly attached to a manway cover that protects the pontoon tank;
an extension system comprising an extension rod that contacts a float at a one end and a gauge rod at an end that is opposed to the end that contacts the float; where the support mechanism contacts the extension rod at a mid-section of the extension rod; and where a displacement of the float is transmitted to the gauge rod causing the gauge rod to be proportionately displaced; where the gauge rod has a scale attached thereto that slides through a passage in the manway cover; where the scale provides a visual indication of a height of a fluid in the pontoon tank.

* * * * *